(12) United States Patent  
Hamilton et al.

(10) Patent No.: US 7,037,364 B2  
(45) Date of Patent: May 2, 2006

(54) EMULSION INK

(75) Inventors: John Hamilton, Perthshire (GB); Keisuke Asada, Miyagi-Prefecture (JP)

(73) Assignees: G R Advanced Materials Ltd, Scotland (GB); Tohoku Ricoh Co. Ltd., Miyagi (JP)

( * ) Notice: Subject to any disclaimer, the term of this patent is extended or adjusted under 35 U.S.C. 154(b) by 0 days.

(21) Appl. No.: 10/985,164

(22) Filed: Nov. 10, 2004

(65) Prior Publication Data

US 2005/0120908 A1    Jun. 9, 2005

(30) Foreign Application Priority Data

Nov. 10, 2003   (GB)  ................................. 0326198

(51) Int. Cl.  
*C09D 11/00* (2006.01)

(52) U.S. Cl. ............... 106/31.26; 106/31.6; 106/31.86; 106/31.9

(58) Field of Classification Search ............ 106/31.26, 106/31.6, 31.86, 31.9  
See application file for complete search history.

(56) References Cited

U.S. PATENT DOCUMENTS

| 5,226,957 | A | * | 7/1993 | Wickramanayake et al. ..... 106/31.26 |
| 5,573,578 | A | * | 11/1996 | Okuda ..................... 106/31.26 |
| 5,622,548 | A | * | 4/1997 | Zou et al. ................ 106/31.26 |
| 5,853,466 | A | * | 12/1998 | Matsuura et al. ......... 106/31.26 |
| 5,880,214 | A | * | 3/1999 | Okuda ........................ 524/801 |
| 5,902,388 | A | * | 5/1999 | Matsuura et al. ......... 106/31.25 |
| 6,632,272 | B1 | * | 10/2003 | Hayashi et al. .......... 106/31.26 |
| 6,632,273 | B1 | * | 10/2003 | Hayashi et al. .......... 106/31.26 |
| 6,699,312 | B1 | * | 3/2004 | Hayashi et al. .......... 106/31.26 |
| 2002/0124770 | A1 | * | 9/2002 | Hayashi .................. 106/31.26 |

FOREIGN PATENT DOCUMENTS

JP    11001648 A    6/1999

\* cited by examiner

*Primary Examiner*—Helene Klemanski  
(74) *Attorney, Agent, or Firm*—Alston & Bird LLP

(57) ABSTRACT

A water-in-oil emulsion ink comprises a water phase and an oil phase, wherein the water phase comprises a pigment, a resin and a water-soluble alcohol or polyol with a boiling point greater than 197° C. The ink has improved image recovery properties.

16 Claims, No Drawings

EMULSION INK

FIELD OF THE INVENTION

The present invention relates to water-in-oil emulsion inks for use in digital duplicating printing processes, and in particular to water-in-oil inks having improved image recovery.

BACKGROUND OF THE INVENTION

This invention relates to the use of involatile alcohols or polyols as components of water-in-oil emulsion inks, which contain pigment and resin in the water phase. The purpose of this invention is to achieve an improved ink for use on digital duplicators, which provides optimum image recovery performance.

The printing performance of digital duplicators has been subject to a series of improvements since their introduction. Recent developments in the design of the printing equipment and stencil master have enabled full rendition of the printed image from the first print in a printing run. Such performance could not be achieved with previous designs because, at the start of printing, ink would not have fully penetrated the porous backing layer of the digital stencil. This porous layer acts as an ink reservoir during the printing process. When there is insufficient ink present within this reservoir the initial prints are incomplete or patchy in appearance and full copy quality is only achieved when an adequate volume of ink is present within the porous layer.

Clearly it is desirable that the achievement of good copy quality from the first print is a consistent aspect of the performance of the digital duplicator. However it is known that when digital duplicators are allowed to remain unused for a period of time, for example in an office or school where no printing takes place over the period of the weekend, then it is frequently necessary to run a number of prints before full copy quality is achieved. This process of regaining full copy quality is termed "image recovery" and the number of copies from the start of printing to achieve this result is used as a quantitative measure of performance. It is an objective of this invention to achieve inks that give the lowest possible values for image recovery even after a prolonged period of non-use. Typically the inks used for this type of printing process are water-in-oil emulsions and the main reason for an increase in image recovery values after a digital duplicator has remained unused for a period of time is a change in the properties of the ink within the printing drum as a result of the evaporation of some or all of its water content. These changes are such that it takes a longer period of time for the ink to penetrate through the screens on the printing drum and through the porous layer of the stencil master.

U.S. Pat. No. 3,421,910 discloses water-in-oil emulsion inks for stencil duplication said to have good copy quality when used on a rotary stencil duplicating machine. One of the exemplified inks comprises a pigment and glycerol in the water phase, and rosin in the oil phase. U.S. Pat. No. 3,421,910 discloses that polyols other than glycerol may be incorporated into its inks, such as diethylene glycol and ethylene glycol. No mention is made of the image recovery properties of the disclosed inks.

U.S. Pat. No. 3,823,020 makes reference to U.S. Pat. No. 3,421,910 and discloses that an unexpected improvement in ink stability can be achieved by formulating inks without a polyol.

EP-A-0661356 and EP-A-0694595 also disclose water-in-oil emulsion inks comprising pigment and resin in the water phase, together with the use of the relatively volatile alcohol, ethylene glycol as a wetting agent. Inks of this type are capable of providing excellent print quality in terms of set-off, and fixing of print to paper. Also, in conjunction with an appropriate design of digital duplicator and stencil master, it is possible to achieve very low values for immediate image recovery. Immediate image recovery is a measure of the number of prints required to achieve full copy quality when the ink is immediately installed on a digital duplicator. However, after leaving a digital duplicator to stand with this type of ink installed for a period such as a weekend, a severe deterioration in image recovery performance is experienced.

SUMMARY OF THE INVENTION

According to a first aspect of the present invention, a water-in-oil emulsion ink comprises a water phase and an oil phase, the water phase comprising a pigment, a resin and a water-soluble alcohol or polyol having a boiling point greater than 197° C., i.e., greater than that of ethylene glycol.

The loss of water through evaporation during periods of non-use of a digital duplicator is an obvious cause of deterioration in image recovery. However, the critical contribution to the deterioration in image recovery, of an alcohol or polyol typically incorporated as an anti-freeze or wetting agent, came as an unexpected discovery to the present inventors in view of the relatively low volatility of commonly cited materials such as ethylene glycol together with their relatively low concentration within the ink.

According to a second aspect of the present invention, a digital duplicating printing process comprises applying to a substrate a water-in-oil emulsion ink of the type described above.

DETAILED DESCRIPTION OF THE INVENTION

The oil phase of the ink comprises an oil or oil blend. The oil phase also typically comprises an emulsifying agent, although an emulsifying agent could instead or additionally be included in the water phase. The oil may be a paraffinic or naphthenic mineral oil, a synthetic hydrocarbon such as polybutene, a hydrocarbon distillate, silicone oil or a vegetable oil such as rapeseed oil, castor oil, soyabean oil, or blends of any of any of the aforementioned oil types. The oil may be volatile or involatile. Preferably a limited amount or no volatile oil is incorporated.

The emulsifying agent is any material capable of creating a water-in-oil emulsion in conjunction with the chosen oil and water phase. Typical materials include but are not restricted to sorbitan esters such as sorbitan monoleate or sorbitan sesquioleate; lipids such as soya lecithin; and polymeric emulsifying agents. The emulsifying agent may be a single emulsifying agent, or a blend of different emulsifying agents.

The oil phase may optionally contain a dissolved resin.

The water phase typically comprises 20 to 85% by weight, preferably 50 to 80% by weight, of the total ink.

The water phase comprises a pigment, which is any particulate capable of creating a visible image when combined with other components to make an ink that can be printed by a digital duplicator. Typical materials include but are not restricted to carbon black in such forms as lamp black, furnace black, channel black and acetylene black; iron; titanium dioxide; and organic pigments such as azo, phthalocyanine, quinacridone, and dioxazine types. The pigment can comprise a single pigment or a mixture of pigments.

Typically the pigment is present in the ink at an average particle size of no more than 10 μm, preferably less than 5 μm, more preferably less than 2 μm, and most preferably less than 1 μm.

When carbon black is use as the sole pigment, the concentration used will typically fall within the range 1 to 20% by weight, preferably 2 to 15% by weight, and most preferably 3 to 9% by weight, of the total ink.

The water phase also comprises a resin. The resin is preferably water-soluble resin. Additionally or alternatively the resin may take the form of a water-borne resin emulsion. The amount of resin included in the ink is typically in the range 0.5 to 30% by weight, preferably 1 to 20% by weight, of the water phase of the ink.

Water-soluble resins include but are not restricted to polymers, copolymers or more complex polymeric permutations of vinyl alcohol, ethylene oxide, vinyl pyrrolidone, vinyl methyl ether, acrylamide; polymers derived from the afore-mentioned monomers in conjunction with other monomers such as styrene, vinyl acetate and acrylic acid esters in such proportions that they confer solubility in water; polymers incorporating the salts of carboxylic or sulphonic acid groups as means of achieving water-solubility, for example sodium salt of styrene-maleic acid copolymers or ammonium salts of acrylate ester-acrylic acid copolymers; cellulose ethers, gelatin. Polymers and copolymers of N-vinyl pyrrolidone are preferred.

Water-borne resin emulsions include but are not restricted to types such as polyurethane, alkyd, and polymers, copolymers or more complex polymeric permutations of vinyl acetate, vinyl chloride, vinylidene chloride, vinyl fluoride, vinylidene fluoride, styrene, acrylic acid esters, methacrylic acid esters, ethylene, butadiene, acrylonitrile.

The water phase also comprises an alcohol or polyol which is soluble in water and which has a boiling point greater than that of ethylene glycol, ie. greater than 197° C., preferably greater than or equal to 205° C., more preferably greater than or equal to 220° C., and most preferably greater than or equal to 245° C.

Suitable materials include, 1,4-pentanediol (boiling point 220° C.), 1,4-butanediol (boiling point 235° C.) diethylene glycol (boiling point 245° C.), triethylene glycol (boiling point 285° C.), polyethylene glycols (range of boiling points), glycerol (boiling point 297° C.) and sorbitol (boiling point >300° C.). A single alcohol or polyol may be used, or a combination of different alcohols and/or polyols. Particularly preferred alcohols are triethylene glycol, polyethylene glycols, sorbitol and glycerol, with glycerol being most preferred.

The amount of alcohol or polyol to be incorporated in the water phase is determined by its two main functions: (1) as an antifreeze agent, and (2) as an evaporation retardant to promote image recovery after a period of non-use. The optimum amount will depend in part on the nature of the alcohol or polyol in the context of providing protection against freezing, and the nature and amount of the resin and pigment in the context of achieving the desired image recovery performance.

Typically, however, the amount of alcohol or polyol incorporated in the ink will be in the range 2 to 30% by weight, preferably 4 to 20% by weight, more preferably more than 5% by weight, and most preferably at least 8% by weight, based on the water phase of the ink.

By way of example, in order for glycerol to provide protection against freezing during transportation and use, it is typically added in an amount of more than 5% by weight, and more typically in an amount of at least 8% by weight, of the water phase. These amounts typically also promote the desired image recovery performance.

Preferably, the resin is soluble in the alcohol or polyol included in the water phase. By this typically we mean that the resin in the amount by weight in which it is incorporated in the water phase is soluble in the alcohol or polyol in the amount by weight in which that component is incorporated in the water phase. This solubility is believed to be important because on evaporation of water from the ink on standing the resin remains dissolved in the alcohol or polyol, thereby eliminating the risk of the resin coming out of solution, for example to form a film on the screens of the printing drum which will impede the passage of ink thus causing a deterioration in its image recovery properties. In the context of this Application, solubility is typically determined at room temperature, which is typically in the range 20 to 23° C.

The water phase of the ink may also contain a separate pigment dispersant, but in a preferred embodiment a water-soluble resin, such as polyvinyl pyrrolidone, is used as the sole pigment dispersant.

The ink may also contain other components such as fillers, antioxidants, pH-adjusting agents, emulsion stabilisers and biocides.

The present invention is further illustrated by reference to the following Examples.

EXAMPLES

Example 1

A water-in-oil emulsion ink was prepared in accordance with the formulation shown in Table 1, in which the amounts of the different components is in grams.

Furnace carbon black (pH value 6) was dispersed in water with 30% polyvinylpyrrolidone solution (Luvitec K30, BASF AG) and 10% sodium hydroxide solution. The dispersion was then milled using a horizontal bead mill to achieve a maximum particle size of less than 1 μm, measured by a Malvern Mastersizer 2000 particle size analyser.

The carbon dispersion was combined with water and ethylene glycol to form a water phase with a pH value of 9.0.

Separately an oil phase was prepared by using a high-speed stirrer to combine Texnap 13 (naphthenic oil, viscosity approximately 14 mm$^2$/s at 40° C., Texaco Ltd.), Texnap 46 (naphthenic oil, viscosity approximately 42 mm2/s at 40° C., Texaco Ltd.) and sorbitan mono-oleate.

A water-in-oil emulsion ink was prepared by stirring the oil phase at high speed and slowly adding the water phase. Stirring was continued for a period after completing the addition of the water phase to ensure that a homogeneous emulsion had been achieved.

The ink was then evaluated by making test prints on a Ricoh Priport JP-8000 digital duplicator using a stencil master where the porous layer had a low pore volume to promote immediate image recovery, for instance of the type described in EP-A-1232876.

After making a series of prints to ensure that the printing drum was fully charged with ink and that full copy quality had been achieved, a new stencil master was generated and printing recommenced to make 50 prints. Immediate image recovery was then assessed by counting the number of prints required to attain full copy quality. A value of 1, representing full copy quality for the first print, provides confirmation that the total system of ink, master and digital duplicator is capable of achieving optimum image recovery.

To replicate the effect of a prolonged period of non-use, the printing drum was then placed in an oven at a temperature of 50° C. for a period of 16 hours. From correlation studies, this accelerated test replicates the effect of not using the printing drum for a period of about 1 month at 23° C. Further a result of less than 10 generally indicates that the result of the immediate image recovery test can be sustained for a period of 72 hours at 23° C.

Examples 2 and 3

Inks were prepared in accordance with the method given in Example 1 except that ethylene glycol was replaced as follows:

Example 2: ethylene glycol replaced by equal weight of diethylene glycol (boiling point 245° C.) Example 3: ethylene glycol replaced by an equal weight of glycerol (boiling point 290° C.)

The results for the accelerated image recovery tests for Examples 1–3 confirm that inks containing diethylene glycol and glycerol provide significantly better performance than the ink containing ethylene glycol. The ink containing glycerol provided better image recovery than the ink containing diethylene glycol.

TABLE 1

| Ink Composition | | Example 1 | Example 2 | Example 3 |
|---|---|---|---|---|
| Water Phase | Water | 51.778 | 51.778 | 51.778 |
| | Furnace carbon black (pH 6.0) | 5.990 | 5.990 | 5.990 |
| | 30% Luvitec K30 solution | 9.984 | 9.984 | 9.984 |
| | 10% Sodium hydroxide solution | 0.003 | 0.003 | 0.003 |
| | 5% Biocide Solution | 0.245 | 0.245 | 0.245 |
| | Ethylene glycol | 7.000 | — | — |
| | Diethylene glycol | — | 7.000 | — |
| | Glycerol | — | — | 7.000 |
| Oil Phase | Texnap 13 | 14.2 | 14.2 | 14.2 |
| | Texnap 46 | 5.0 | 5.0 | 5.0 |
| | Sorbitan mono-oleate | 5.8 | 5.8 | 5.8 |
| TOTAL | | 100 | 100 | 100 |
| Printing test results | | | | |
| Immediate image recovery | | 1 | 1 | 1 |
| Image recovery after 16 hours at 50° C. | | 37 | 9 | 6 |

That which is claimed:

1. A water-in-oil emulsion ink comprising a water phase and an oil phase, wherein the water phase comprises a pigment, a resin and a water-soluble alcohol or polyol with a boiling point greater than 197° C., and wherein the resin is soluble in the water-soluble alcohol or polyol.

2. An ink according to claim 1, wherein the water-soluble alcohol or polyol has a boiling point greater than or equal to 220° C.

3. An ink according to claim 2, wherein the resin is water-soluble.

4. An ink according to claim 3, wherein the resin is polyvinyl pyrrolidone.

5. An ink according to claim 2, wherein the resin is a water-borne emulsion resin.

6. An ink according to claim 2, wherein the water-soluble alcohol or polyol includes an alcohol or polyol selected from the group consisting of triethylene glycol, polyethylene glycols, glycerol, sorbitol, and mixtures thereof.

7. An ink according to claim 6, wherein the resin is water-soluble.

8. An ink according to claim 7, wherein the resin is polyvinyl pyrrolidone.

9. An ink according to claim 6, wherein the resin is a water-borne emulsion resin.

10. An ink according to claim 1, wherein the water-soluble alcohol or polyol is glycerol.

11. An ink according to claim 1, wherein the resin is water-soluble.

12. An ink according to claim 13, wherein the resin is polyvinyl pyrrolidone.

13. An ink according to claim 1, wherein the resin is a water-borne emulsion resin.

14. An ink according to claim 1, wherein the pigment is carbon black.

15. An ink according to claim 14, wherein the resin is the sole dispersant for the pigment.

16. An ink according to claim 1, wherein the resin is the sole dispersant for the pigment.

* * * * *